United States Patent [19]

Schobl

[11] Patent Number: 4,458,624
[45] Date of Patent: Jul. 10, 1984

[54] TEMPERATURE VERIFICATION DEVICE

[75] Inventor: Howard T. Schobl, Imperial, Pa.

[73] Assignee: Schobl Enterprises, Inc., Imperial, Pa.

[21] Appl. No.: 380,215

[22] Filed: May 20, 1982

Related U.S. Application Data

[63] Continuation-in-part of Ser. No. 173,054, Jul. 28, 1980, Pat. No. 4,341,118.

[51] Int. Cl.³ .................. G01K 5/70; G01D 11/16; G01D 13/24
[52] U.S. Cl. .................. 116/221; 116/294; 374/104; 374/206
[58] Field of Search .................. 374/206, 207, 205; 73/709; 116/294, 297, 296, 295

[56] References Cited

U.S. PATENT DOCUMENTS

| | | | |
|---|---|---|---|
| 1,795,076 | 3/1931 | Crowley | 73/709 |
| 1,932,159 | 10/1933 | Gruver et al. | 73/709 |
| 2,209,539 | 7/1940 | Ruopp | 73/709 |
| 2,681,635 | 6/1954 | Bowen | 116/294 X |
| 3,796,101 | 3/1974 | Howard | 374/206 X |
| 4,081,999 | 4/1978 | Lenken | 374/106 |
| 4,169,381 | 10/1979 | Skopil | 374/205 |

FOREIGN PATENT DOCUMENTS

| | | | |
|---|---|---|---|
| 2808746 | 9/1979 | Fed. Rep. of Germany | 116/294 |
| 0853037 | 3/1940 | France | 116/297 |

Primary Examiner—Daniel M. Yasich
Attorney, Agent, or Firm—Lawrence G. Zurawsky; Harry B. Keck

[57] ABSTRACT

A temperature verification device employs a coiled bimetallic strip having its temperature responsive, rotatable outer end engaged with an indicator flag which is connected with a finger-like projection spaced outwardly from the indicator flag. A stop member is provided in the path of the distal end of the finger-like member and is adapted to engage the distal end when the flag member is moved in one direction, for example, clockwise. Movement of the flag member in the opposite direction can be achieved because the resilient finger-like member will slide past the stop member. All of the structure is confined in a casing having an opening through which the flag indicator may be observed under certain conditions. The stop member can be positioned at any selected location about the periphery of the casing to function as a holding means for the flag indicator at a preselected temperature threshold. Reversal of the orientation of the bimetallic strip permits the temperature threshold to be a maximum temperature or a minimum temperature.

10 Claims, 7 Drawing Figures

TEMPERATURE VERIFICATION DEVICE

CROSS-REFERENCE TO RELATED APPLICATION

This application is a continuation-in-part of my copending application, Ser. No. 173,054 filed July 28, 1980, now U.S. Pat. No. 4,341,118.

BACKGROUND OF THE INVENTION

1. Field of the Invention

This invention relates to an automatic temperature verification device and more particularly to a device which provides a visual indication of an ambient temperature above or below a first predetermined temperature level and further provides for maintaining a permanent visible indication in the event the ambient temperature passes above or below a second predetermined temperature level.

2. Statement of the Prior Art

Frequently in the use, transporation, and storage of materials at critical temperatures, failures occur in the power system or elsewhere which allow the ambient temperature to rise above or fall below a predetermined level. There is a need for an inexpensive temperature indicator device which will provide a visible indication of the transition of the storage temperature above or below a first critical temperature level. Appearance of the visible indication permits the user to take corrective steps before permanent deterioration of the goods. As an example, in the storage of frozen foods, there is a need for the operator to be aware if the storage temperature rises above a first critical level. The operator can take corrective measures to prevent further temperature rises, for example, by promptly transferring the foods to another storage container where the adequate low temperatures are maintained.

There is a further need for the operator to know if the temperature has at any time passed a critical temperature level at which deterioration occurs. For example, in the storage of frozen foods, if a power outage occurs while no person is in attendance, the frozen food might rise above required temperature levels and thereafter, upon restoration of power, the storage temperature would be returned to an acceptable frozen food storage temperature. Irreversible damage to the thawed food occurs under these circumstances and the operator is not aware that the damage has occurred. Accordingly there is a need for a visible indicator device which will provide a notice that the temperature has passed a second critical temperature level, despite the fact that the ambient temperature in the compartment has returned to an acceptable level.

There is a further need for a temperature verification device that is not rapid in its action. A slow, but affirmative response temperature indicator is required for storage areas where doors are open for short periods of time to load or remove material. Some inherent delay in response of the temperature verification device is desirable. The temperature verification device furthermore should be reasonably tamperproof so that thin wires or small tools cannot be inserted to compromise the device after its set point has been established.

There is a further need for an inexpensive device which can accommodate both described functions and further can accommodate either temperature which exceeds a maximum, or temperature which falls below a minimum.

The copending U.S. patent application Ser. No. 173,054, filed July 28, 1980, discloses a useful temperature indicating device which inexpensively and compactly accomplishes the stated objectives of the present invention. In that copending patent application, the outer end of a coiled temperature-responsive bimetallic strip rotates and establishes a predetermined position relative to the casing in accordance with the ambient temperature so long as a predetermined maximum or minimum temperature is not exceeded. The outer end of the coiled bimetallic strip is secured to a temperature indicating element which moves corresponding to the outer end of the coiled bimetallic strip. When the predetermined maximum or minimum temperature is exceeded, a locking device is released to prevent reverse movement of the temperature indicating element and the outer end of the bimetallic strip. The assembly of that device requires positioning of a number of individual components. The device furthermore requires a somewhat delicate factory setting.

STATEMENT OF THE INVENTION

A temperature verification device is provided which has inexpensive construction and assembly and includes fewer components than the prior art devices. This temperature verification device provides for visible indications of maximum temperature levels or visible indication of minimum temperature levels. The device further includes locking means which maintain a permanent visible indication that the device has passed through a predetermined temperature level which may be either a maximum temperature or a minimum temperature. The device employs a temperature-responsive element such as a coiled bimetallic strip to move a temperature indicating flag into a position aligned with a window in the casing. The flag and the bimetallic device rotate about a common shaft. A deformable fingerlike member moves with the flag in a circular locus about the same shaft. A one-directional stop member is provided in the locus of the fingerlike member for deforming the fingerlike member as it rotates in one direction and for capturing the fingerlike member and preventing its return movement. In a preferred embodiment, the stop member comprises an inward projection from a circular cover plate.

The setting of the present device is accomplished by providing a circular disk with spaced apertures in a circular locus adjacent to its perimeter. The circular locus coincides with an aperture in the casing of the device. A locking member may be introduced through the casing aperture and through a selected one of the spaced apertures for retaining the circular disk in a set position relative to the casing until the device is installed in its intended environment.

The present temperature verification device can be designed to be relatively slow in its action by means of the limited air passageways or entry of ambient air into the response chamber of the device. The restricted apertures moreover resist tampering with wires and small tools.

DESCRIPTION OF THE PREFERRED EMBODIMENTS

Figure 1:
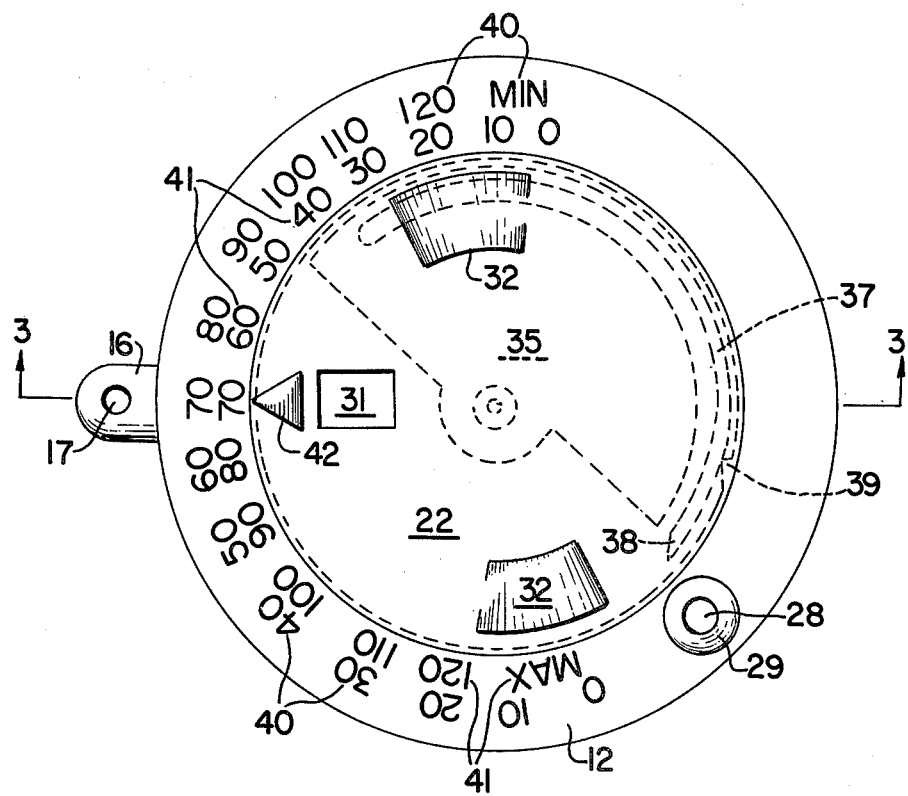
FIG. 1 is a plan view of the present temperature verification device showing in phantom outline the flag member, fingerlike projection and stop member.
Figure 2:
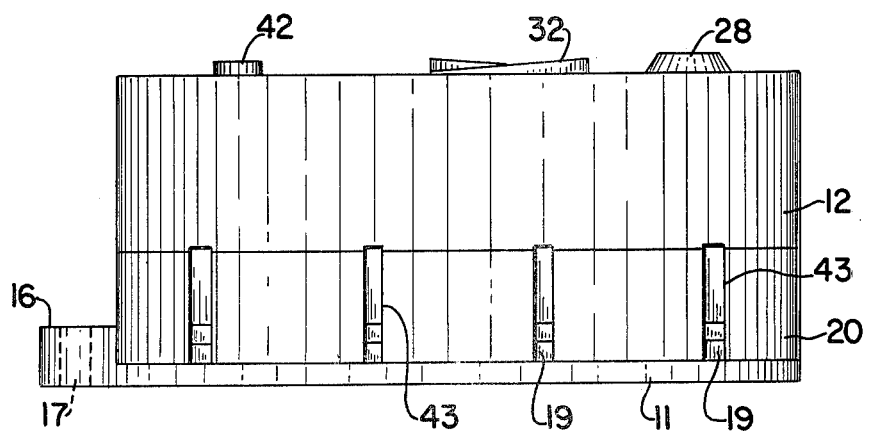
FIG. 2 is a side elevation view of the temperature indicating device.

The present device is housed in a casing formed from a base member 11 and a cover member 12. The base member is generally circular in cross-section and includes a back wall 13, a central shaft 14 and generally cylindrical sidewalls 15. A tab 16 extends outwardly from the back wall 13 and is provided with a hole 17 to permit hanging or otherwise supporting the device. The cylindrical sidewalls 15 have an upper edge 18 comprising a ring which is generally parallel to the back wall 13. A peripheral shoulder 19 around the back wall 13 receives a cylindrical sidewall 20 of the cover member 12. The cylindrical sidewall 20 is notched to fit over the tab 16. The cylindrical sidewall 20 of the cover member 12 outwardly, telescopingly fits over the cylindrical sidewalls 15 of the base member 11. To provide visible indication of tempering with the device, the cover member 12 is secured to the base member 11 by means of suitable adhesives, fusion, welding or other means between the cylindrical sidewall 20 and the peripheral shoulder 19.

The cover member 12 has a circular opening 21 for receiving a circular disk 22 which has a central pin 23 engageable in a recess 24 at the top of the central shaft 14. The central disk 22 also has a peripheral shoulder 25 which engages the circular opening 21 and the inner surface of the cover member 12 adjacent to the circular opening 21. Outwardly from the shoulder 25, the cylindrical disk 22 has an annular ring 26 with evenly spaced apertures 27.

Figure 5:
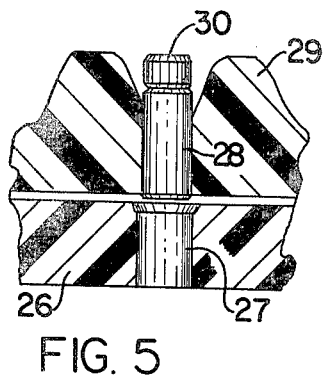
FIGS. 5, 6, 7 are illustrations of a setting locking member which secures the circular disk relative to the casing after setting and prior to installation.
Figure 6:
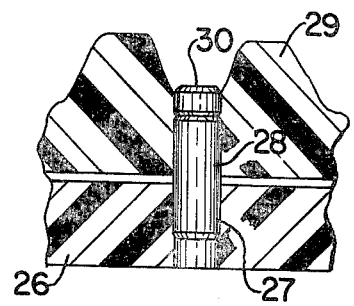
Figure 7:
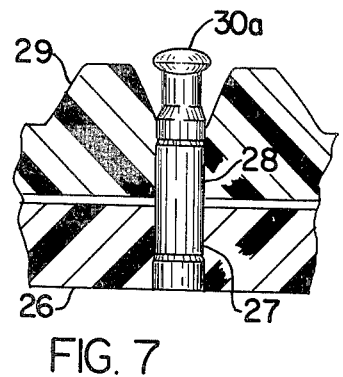

An aperture 28 extends through the cover member 20 in alignment with the circular locus of the spaced apertures 27 of the circular disk 22. A boss 29 is provided in the cover member 12 around the aperture 28. As shown in FIGS. 5, 6, 7, hereinafter more fully described, a pin member 30 (30a) is provided to align the aperture 28 with the aperture 27 and thereby to retain the circular disk 22 in a fixed position relative to the cover member 12.

The circular disk 22 is provided with an aperture 31 comprising a window permitting an observer to inspect the interior of the device.

One or more wedges 32 are provided in the circular disk 22 to facilitate turning the circular disk 22 with respect to the cover member 12 prior to introduction of the pin member 30.

Figure 4:
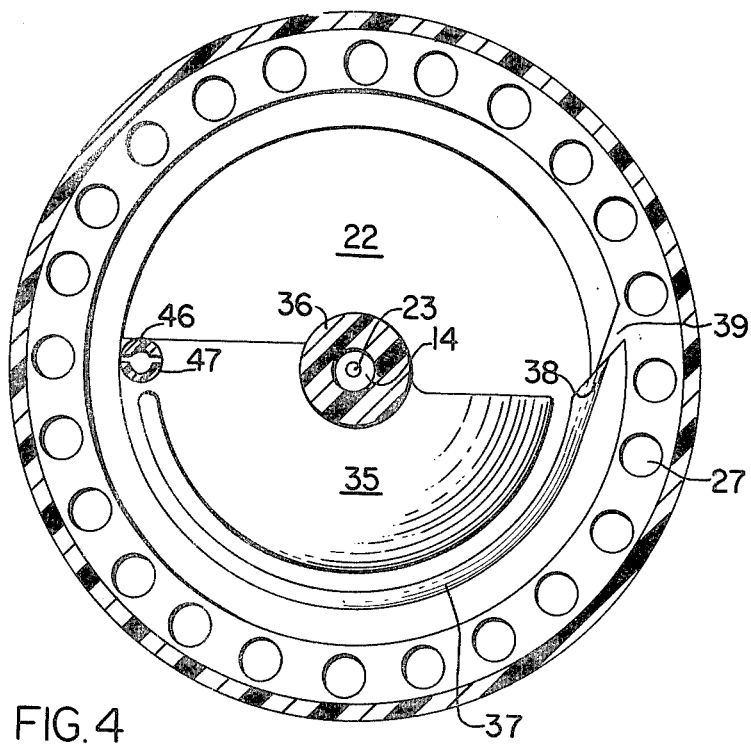
FIG. 4 is an internal view taken along the line 4—4 of FIG. 3.

A coiled bimetallic strip 33 has its inner end secured to the shaft 14 and its outer end 34 positioned so that it is free to rotate about the shaft 14 and assume a pre-established position in accordance with the ambient temperature. The outer end 34 is bent radially outwardly from the spiral of the bimetallic strip 33. A temperature indicating member or flag 35 is a generally semi-circular plate as seen in FIGS. 1 and 4 and is provided with an apertured central interior boss 36 which outwardly telescopingly engages the reduced diameter distal end of the central shaft 14. A depending pin 46 has a radial groove 47 which engages the outer end 34 of the coiled bimetallic strip 33. A fingerlike member 37 is coplanar with the temperature indicating member 35 and is disposed annularly thereof. The distal end 38 of the fingerlike member 37 terminates in a sharp edge. In a preferred embodiment, the fingerlike member 37 and the temperature indicating member 35 are formed in a common plastic body. Other materials of construction are feasible.

A cam 39 is provided on the inner surface of the circular disk 22 over the inner surface of the annular ring 26. The cam 39 penetrates into the locus of circular movement of the distal end 38 of the fingerlike member 37. The fingerlike member 37 is deformable and can be easily moved within the plane of the temperature indicating member 35 or out of the plane of the temperature indicating member 35.

Referring to FIG. 1, it will be observed that the distal end 38 of the fingerlike member 37 can be deformed inwardly toward the temperature indicating member 35 as the temperature indicating member 35 and fingerlike member 37 rotate counterclockwise past the cam 39. After the distal end 38 of the fingerlike member 37 has passed the cam member 39, the point of the distal end 38 is captured between the cam 39 and the inner surface of the annular ring 26. Further counterclockwise movement can be accommodated, but the fingerlike member 37 and indicating member 35 cannot move clockwise past the cam 39.

Two concentric temperature scales are provided in the top surface of the casing base member 11 as indicated by the numerals 40, 41. The scales proceed in opposite directions; one being employed for minimum temperature response and the other for maximum temperature response. A pointer indicator 42 in the exposed surface of the circular disk 22 indicates the ambient threshold temperature of the device.

The cover member 12 has openings 43 which permit the passage of air past the sidewalls 20 and into an annular space 44, beneath circular disk 22 and thence to the interior chamber 45 in which the coil of bimetallic strip 33 is mounted. Air ingress to the annular space 44 is thus restricted thereby retarding the response of the device to ambient temperatures. The slow response of the device is particularly desirable for storage areas where doors are opened for short periods of time to load or remove materials. The restricted passageways also deter tampering with the instrument.

Operation

Figure 3:
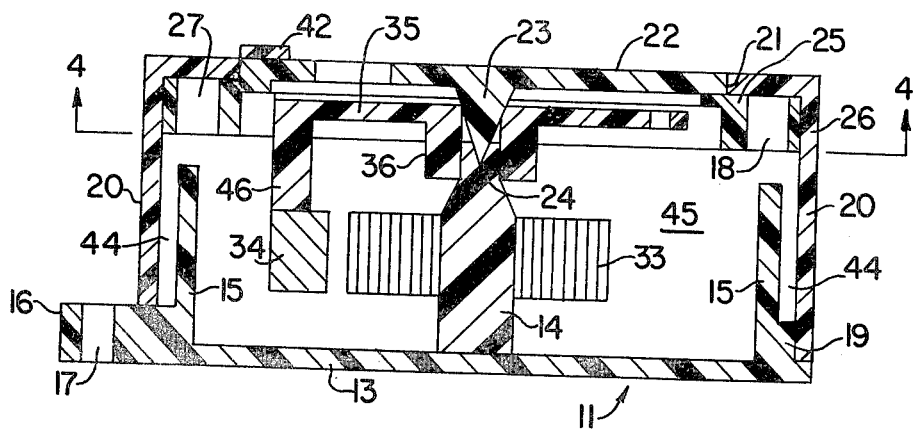
FIG. 3 is a cross-section view taken along the line 3—3 of FIG. 1.

The coiled bimetallic strip 33 may be mounted as shown in FIG. 3, i.e., in a position whereby decreasing temperature will cause counterclockwise movement of the outer end 34 as viewed from the top of the device. In this first embodiment, also shown in FIGS. 1 and 4, the temperature indicating member 35 will respond to temperatures below a predetermined value. Alternatively, in a second embodiment, the coil of bimetallic strip 33 may be reversed from the position in which it is shown in FIG. 3 so that the outer end 34 will move clockwise as the temperature is lowered. In this second embodiment, the same temperature indicator 35 will indicate temperatures above a pre-established level.

Referring, for example, to FIG. 1, the indicated threshold temperature is 70 degrees (refer to the pointer 42). Existing temperature is approximately 90 degrees, although an observer of the instrument would not know this from an inspection of the instrument since the aperture window 31 has no visible indication. As the temperature of the device decreases, the temperature indicating member 35 rotates in a counterclockwise direction until a portion of the temperature indicating member 35 appears in the aperture window 31, providing a visible indication to an observer that the temperature environment is approaching the first critical level. It will be further observed from FIG. 1 that the distal end 38 of the fingerlike member 37 is deflected inwardly of the cam 39. This inward deflection occurs easily and creates no appreciable resistance to the continued counterclockwise rotation of the temperature indicating member 35 and the fingerlike member 37. However, after the temperature indicating member 35 has moved counterclockwise to a position where it fills the aperture window 31, the distal end 38 of the fingerlike member 37 will pass over the cam 39 and the pointed distal end 38 will be captured between the cam 39 and the inner wall of the annular ring 26. As the device is shown in FIG. 1, the capture will occur as the temperature lowers to about 60 degrees. Thereafter, the temperature indicating member 35 cannot move in a clockwise direction, and instead is locked in the tell-tale position beneath the aperture window 31. If the temperature continues to lower, the temperature indicator 35 will continue to be visible beneath the window aperture 31. This results from the size and shape of the indicating member 35 and the related operating range of the bimetallic strip 33. Any subsequent increase of the temperature will permit the temperature indicating member 35 to move clockwise only until the distal end 38 of the fingerlike member 37 is captured between the cam 39 and the inner wall of the annular ring 26.

Response Temperature Setting

If the present device is assembled in the form shown in FIGS. 1, 3, 4, it is necessary that the temperature setting occur at a temperature above the established threshold temperature for locking the indicator in position. To set the device to lock below about 70 degrees temperature, the device must be set while its temperature is above 70 degrees. Setting occurs by assembling the device with the distal end 38 of the fingerlike member 37 positioned clockwise relative to the cam 39 (FIG. 1). The indicator 42 is then positioned at the selected threshold temperature on the exterior scale 40 and a pin member 30 is moved from the position shown in FIG. 5 to the position shown in FIG. 6 so that the pin member locks together the cover member 12 and the circular disk 22 by aligning and pinning the apertures 28, 27. The pin member 30, as shown in FIGS. 5 and 6, is intended for a single use so that the device cannot be unintentionally released from its set position. An alternative pin 30a in FIG. 7 has a handle portion to permit withdrawal for repeated uses.

Reversible Operation

If it is desired to employ the same temperature sensing device to indicate passage of the unit through a predetermined maximum temperature, the coil of bimetallic strip 33 is reversed on shaft 14 so that increasing temperatures will result in counterclockwise movement of the outer end 34 about the shaft 14. In this alternative presentation, an increasing temperature will cause counterclockwise movement of the temperature indicator device 35 and the related fingerlike member 37. The appropriate scale is the inner scale 41. In order to set the device under these circumstances, it is necessary that the device be maintained at a temperature below the selected threshold temperature. In all other respects the setting is identical.

The cam 39 has been shown as penetrating the locus of movement of the distal end 39 of the fingerlike member 37 in the plane of the temperature indicating member 35. As an alternative, a different cam or stop member can depend from the circular disk 22 to deflect the distal end 38 out of the plane of the temperature indicating member 35.

It will be observed that the present device comprises five assembly components including
the base member 11, the cover member 12, the circular disk 22, the coil of bimetallic strip 33, and the temperature indicator member 35 which also includes the fingerlike member 37.

The device is simply assembled by initially mounting the coiled bimetallic strip 33 on the shaft 14, preferably by inserting the inner end of the coiled bimetallic strip 33 into a slot in the base of the shaft 14. Thereafter the temperature indicating member is positioned over the narrow upper end of the shaft 14 and the fingerlike member 37 is slipped over the outer edge 34 of the coiled bimetallic strip. Thereafter the circular disk 22 is mounted with the central pin 23 rotatably supported by the recess 24 in the shaft 14. Finally, the cover member 12 is positioned above the circular disk 22 with an appropriate sidewall groove (not shown) engaging the tab 16. The cover member 12 may be connected to the peripheral shoulder 19 by means of an appropriate adhesive, weld, or by fusion.

So long as the pin member 30 is not in a secured position, it is possible to rotate the circular disk 22 freely in a clockwise direction (as shown in FIG. 1). Any attempted rotation of the circular disk in a counterclockwise direction will cause the distal end 38 of the fingerlike member 37 to become captured between the cam 39 and the inner wall of the annular ring 26 so that any further attempt to turn the circular disk 22 in a counterclockwise direction will cause the temperature indicator member 35 and the engaged coiled bimetallic strip to turn.

In a freezer installation which has a tendency to build up frost, the device may be placed in a moisture-proof plastic bag to preclude frost build-up in the device.

The present temperature verification device provides a useful means for indicating that the environment has passed through a critical temperature, either maximum or minimum. This device is helpful to processors and handlers of foods, pharmaceuticals, adhesives, coatings, plastics and any products which are temperature-sensitive.

In accordance with the patent statutes, the invention has been described and claimed and the best embodiment known at the time of filing has been set forth. The invention may be practiced in other embodiments within the scope of the claims.

I claim:
1. A temperature verification device comprising:
   a casing having an upper surface with a circular opening therein;
   a temperature responsive element mounted on a shaft within the said casing for arcuate movement about the said shaft;
   an indicating member engaged with said temperature responsive element and being rotatable in response to said temperature responsive element;

a circular disk rotatably secured within the said circular opening and having an aperture which opens into the interior of said casing;

an arcuate fingerlike member extending from and being generally coplanar with said indicating member in a generally circular locus outwardly from said indicating member;

a stop member on the interior of said disk projecting into the path of the end of the said fingerlike member;

the said fingerlike member having sufficient flexibility to deform and pass the said stop member in one direction but being releasably captured by the said stop member and prevented from moving past the said stop member in the opposite direction;

securing means for selectively fastening the said circular disk within the said circular opening whereby rotary movement of the said indicating member into a position aligned with the said aperture occurs at a first predetermined temperature and whereby the said fingerlike member is captured at a second predetermined temperature.

2. The temperature verification device of claim 1 wherein the said casing is formed from a base member and a cover member, the said base member being generally circular in cross-section and including a circular back wall and cylindrical sidewalls; and the said cover member has a cylindrical sidewall for outward telescoping engagement with the base member sidewalls.

3. The temperature verification device of claim 1 wherein the said shaft is centrally connected to the said base member and has a narrow distal end; the said temperature responsive element being a coiled bimetallic member having its inner end secured to the said shaft; the said flag member telescopingly engaging the narrow distal end of the said shaft; the said indicating member further having a direct connection to the outer end of the said bimetallic strip;

whereby rotation of the outer end of the said bimetallic strip causes a corresponding movement of the said indicating member.

4. The temperature verification device of claim 1 wherein the said fingerlike member and the said indicating member are formed in a common body.

5. The temperature indicating device of claim 1 wherein the said stop member comprises a cam which is an integral component of the said circular disk.

6. The temperature verification device of claim 1 wherein the said path of the end of the said fingerlike member is a circular locus internally concentric with the perimeter of the said circular disk.

7. The temperature verification device of claim 1 wherein the said circular disk has a plurality of evenly spaced apertures in a circular locus adjacent to its periphery; the said casing has at least one corresponding aperture positioned in the locus of the said spaced apertures; and a connection means is provided to secure the said circular disk with respect to the said casing by pinning one of said spaced apertures with one of said casing apertures.

8. A temperature verification device according to claim 7 wherein the said means for pinning comprises a pin which can be frictionally maintained in the said aperture of the casing and can be advanced inwardly into a selected one of the said spaced apertures.

9. The temperature verification device of claim 8 wherein the said pin has an outwardly extending handle to permit withdrawal for recalibration and reuse of the device.

10. The temperature verification device of claim 1 wherein the said casing has an outwardly extending apertured tab which comprises a support means for the device.

* * * * *